United States Patent [19]

Hanni

[11] 3,843,927

[45] Oct. 22, 1974

[54] TIME MULTIPLEX TRANSMISSION SYSTEM

[75] Inventor: Manfred Hanni, Muenchen, Germany

[73] Assignee: Siemens Aktiengesellschaft, Berlin & Munich, Germany

[22] Filed: Mar. 24, 1972

[21] Appl. No.: 237,995

Related U.S. Application Data

[63] Continuation of Ser. No. 861,077, Sept. 25, 1969, abandoned.

[30] Foreign Application Priority Data

Sept. 30, 1968 Germany ........................... 1762955

[52] U.S. Cl. ............. 325/4, 179/15 BY, 179/18 FD

[51] Int. Cl. ............................................ H04m 7/16

[58] Field of Search........ 179/15 AS, 18 FF, 15 BU, 179/15 AT, 15 BA, 15 BS, 18 FO, 15 BY; 325/4

[56] References Cited

UNITED STATES PATENTS

| | | | |
|---|---|---|---|
| 2,486,605 | 5/1961 | Killian | 179/18 FF |
| 2,691,067 | 10/1954 | Buchner | 179/18 FF |
| 3,261,001 | 7/1966 | Magnin | 179/15 BA |
| 3,403,383 | 9/1968 | Kienzle | 179/15 AT |
| 3,406,257 | 10/1968 | Long | 179/15 AS |
| 3,458,659 | 7/1969 | Sternung | 179/15 AQ |
| 3,517,312 | 6/1970 | Yamato | 325/4 |
| 3,532,985 | 10/1970 | Glomb | 179/15 BS |
| 3,535,450 | 10/1970 | Vollmeyer | 178/50 |
| 3,548,108 | 12/1970 | Yamato | 179/15 BY |

*Primary Examiner*—David L. Stewart
*Attorney, Agent, or Firm*—Hill, Gross, Simpson, Van Santen, Steadman, Chiara & Simpson

[57] ABSTRACT

In a time multiplex transmission system of a large number of channels, particularly time multiplex telephone systems for satellite connections where connections are to be established between certain channels of various stations and an exchange is assigned to each station which is utilized to connect the transmission channels available at the exchange to the system wherein a time section is assigned to each transmitting station within the pulse frame of the time multiplex system. The time multiplex channels of this exchange are within the time section and an internal signal channel is included which contains data as to which time multiplex channel of the time interval is to be connected through to a certain station. In the desired receiving station a series-parallel converter is provided for the time multiplex signals arriving, the converter storing the code words produced during conversion in buffer memories separated for the individual time multiplex channels for further processing and delivery to the telephone exchange assigned to the receiving station. The receiving station is provided with a control and switching mechanism for which determines upon receiving signals intended for the station, an available connection between the station and its corresponding exchange and connects a buffer memory assigned to such an available connection to receive information from the series-parallel converter.

12 Claims, 5 Drawing Figures

INVENTOR
MANFRED HANNI
BY Hill, Sherman, Meroni, Gross & Simpson
ATTORNEYS

INVENTOR
MANFRED HANNI

BY Hill, Sherman, Meroni, Gross & Simpson
ATTORNEYS

INVENTOR
MANFRED HANNI
BY Hill, Sherman, Meroni, Gross & Simpson ATTORNEYS

INVENTOR
MANFRED HANNI

BY Hill, Sherman, Meroni, Gross & Simpson
ATTORNEYS

TIME MULTIPLEX TRANSMISSION SYSTEM

This is a continuation, of application Ser. No. 861,077, filed Sept. 25, 1969, now abandoned.

BACKGROUND OF THE INVENTION

1. Field of the Invention

This invention relates to a time multiplex transmission system having a large number of transmission channels, and particularly to time multiplex systems for satellite connections wherein connections are to be established between certain channels of various stations and an exchange is assigned to each station which is utilized to connect the transmission channels available at the exchange to the system connected to the exchange, particularly telephone systems.

2. Description of the Prior Art

Time multiplex systems of the type discussed herein are presently provided for satellite connections. These provisions are based on the idea that a major number of ground stations located in various locations, preferably in different countries, are to establish among each other connections for transmission. The planning of such systems provides a pulse frame common for the entire system, for example of 125 $\mu$ seconds duration which corresponds to a scanning frequency 8Kc per individual channel, is provided as a periodically repeating pulse frame. This pulse frame is divided into a number of short time sections (bursts) corresponding to the number of ground stations in the overall system, each of which is assigned to a definite station for transmission. Each station transmits its total information within the time section assigned to it and to the satellite so that it jointly transmits to all stations the pulse frame comprising all bursts. The individual burst basically starts with a synchronous signal and a subsequent identification symbol of the transmitting station. This is followed by a so-called internal signal channel inherent to the burst and this is followed in timely sequence by the individual time multiplex transmission channels of the station in question. A criterion pointing out for which of the other stations data are contained in this burst and in which time-slot, that is in which code word of the burst information is to be found, is transmitted over the signal channel inherent to the burst. However, this information is transmitted only for the time the connection is established for a certain transmission channel and for the disconnection of said connection at the end of the transmission of the information, for example when the conversation is terminated. This results in overall picture for the pulse frame and the individual bursts is schematically shown in the drawings.

The connection between the receiving station in each case and the corresponding telephone exchange forms a difficult problem in such time multiplex transmission systems with regard to the selection of the line free between these points for establishing or building up the connection. Either, according to considerations from prior art, a correspondingly high number of output lines of the receiving station is provided and a particular intermediate exchange is assigned which selects the lines free in each case to the subscriber's exchange, or there is already provided in the allocation of the pulse frame and the transmission channels a definite allocation in the individual bursts between the individual stations (definite channel assignment).

The former solution requires an unusually high expenditure because practically for all transmission channels all of the time multiplex system output connections must be provided at the receiving station and out of all such connections only a fw must be selected which are aimed for referal to the subscriber's exchange, let alone the structure of the rear connection with its difficulties. The last-named solution lacks the necessary flexibility in the entire system. The exploitation of the system is substantially curtailed by the fixed allocation and definite channel assignment because, in practice, the need for speech circuits and/or four-wire connections between the individual stations varies in time.

It should be also mentioned with regard to such time multiplex transmission systems that this manner of establishing connections is utilized only for making available a four-wire transmission path per required transmission channel and that subsequent to the establishment of such a four-wire transmission path the search for subscribers is accomplished by corresponding selective transmission of criteria in the usual manner, for example by "in-band signalling" or "out-band signalling" in the transmission channel. This transmission of selective criteria influences the individual four-wire connection as such no longer and is utilized only to control the subscriber's exchange and/or the telephone system, data transmission or telegraphy transmission system which is connected to it. Such systems are even applicable to telephone connections. Basically, such time multiplex transmission systems may also be operated unidirectionally only, that is with elimination of the return path.

The present invention is based on the problem of obviating in a time multiplex transmission system of the type initially described the difficulties which occur at the transfer from the receiving station in each case to the corresponding exchange. To be specific, when necessary, the formation of four-wire communications is to be facilitated substantially.

SUMMARY OF THE INVENTION

It a time multiplex transmission system of a large number of channels, particularly time multiplex systems for satellite connections where such connections are to be established between certain channels of various stations and an exchange is assigned to each station which is used to connect the transmission channels available at the exchange to the system connected to the exchange, particularly telephone systems, wherein a time section is assigned to each transmitting station within the pulse frame of the time multiplex system. The time multiplex channels of this exchange are within said time section, and an internal signal channel is included which contains data as to which time multiplex channel contained in the time interval is to be connected through to a certain station. In addition, in the certain receiving station a series-parallel converter is provided for receiving the time multiplex signals, said series-parallel converter storing the code words produced during this conversion and to be evaluated in the station in buffer memories which are separated for the individual time multiplex channels for further processing and delivery to the telephone exchange assigned to the receiving station. This problem is solved, according to the present invention, in such a manner that in the receiving station a control and switching system is provided which determines, upon receiving signals intended for this station, a connection which happens to be available at this moment between the station and its corresponding exchange and connects the buffer memory assigned to such an available connection upon receipt of the code word to be evaluated by the transmitting station.

For the establishment of four-wire connections it is advantageous when the control mechanism and the switching mechanism are switched through the system in the rearward direction toward the transmitting end during the search for the available connection with the exchange corresponding to the receiving station via the burst corresponding to its transmitter. A transmission channel completes the entire connection into a four-wire transmission path utilizing the time multiplex phase corresponding to the now busy connection between the receiving station and the exchange.

In this connection it is expedient and particularly advantageous if, in addition to the information about the corresponding releasing transmission, also the information about the timewise allocation of the return path is transmitted to the station thereby causing the structure of the entire connection to be made by way of the signal channel in the burst assigned to the transmitter of the receiving station.

A further improvement of the invention which in an advantageously simple manner makes possible the simultaneous operation of the time multiplex transmission system for speech signals and data and/or telegraphy signals is characterized by the fact that bits of the data and/or telegraphy transmission which are fixedly predetermined in their time positions are reserved in the bit sequence of the burst assigned in each case to the individual stations and the remaining bits are available for the formation of transmission channels for speech signals, and that the control and switching system of the receiving station may be designed so that it only connects as many places in the individual buffer memory as there are bit places contained in the code word of the transmission channel to be established.

One advantageous embodiment of the time multiplex transmission system is characterized by the fact that each of the receiving stations is provided with its own signal receiver for each transmitting burst assigned to the individual stations, that each receiving station is provided with a free finder (line finder) for finding available connecting lines between said station and the corresponding exchange, a that a connecting memory is provided in each receiving station which establishes from the output criteria of the signal receiver and finder the switching interval for the connection between the series-parallel converter and the buffer memory assigned in each case as a connection established as available to the exchange.

It is also advantageous when the buffer memory containing for each bit of the individual code word a separate memory place consists of a first memory element into which the information from the series-parallel converter is stored by way of a switch corresponding periodically operated that an additional memory element is provided into which the stored information is transferred following storage in the first memory, and that removal from the second memory is provided at a time during which the second memory element is separated from the first storage element.

In pulse demodulation, it is further advantageous to employ a decoder common to all memories and connected via a cyclically rotating scanning switch consecutively to the individual buffer memory outputs. Furthermore a cyclically rotating distributor is connected to the output of the decoder which is operating synchronously with the scanning switch and the individual lines leading to the exchange are connected to its output connections.

It is advantageous that for determining the lines available in ease case between the receiving station and the corresponding exchange that a testing apparatus is provided which determines which of the buffer memories is not busy, and which identifies the free and available buffer memory as an available connection to the exchange. It is further advantageous if the exchange memory for each burst and all time multiplex channels possible therein is provided with separate memory places having a number of storage locations for each of the multiplex channels.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
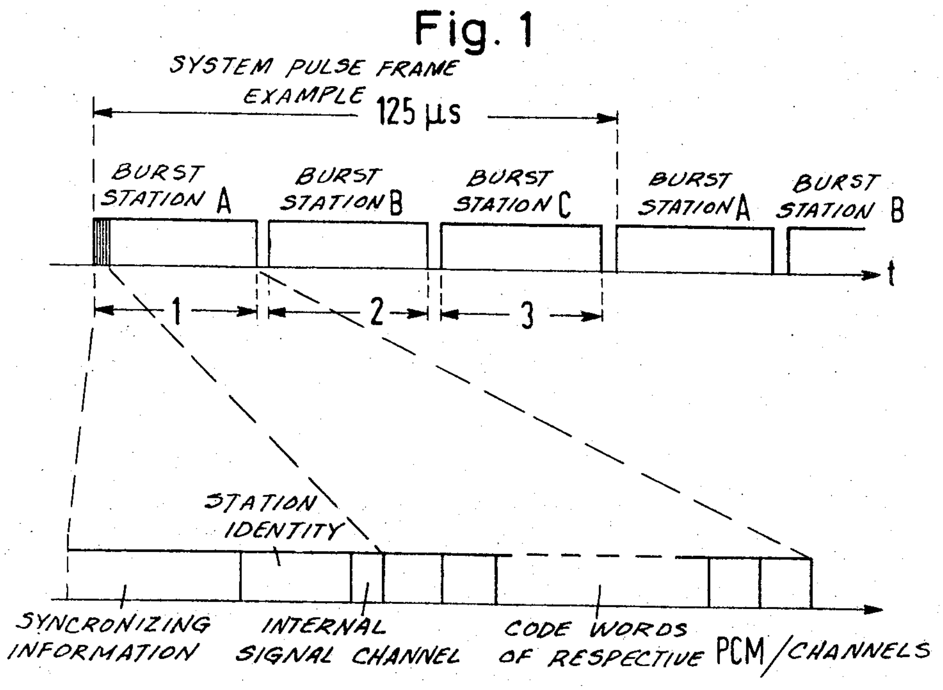
FIG. 1 is a timing diagram for the time multiplex transmission system according to the present invention.
Figure 2:
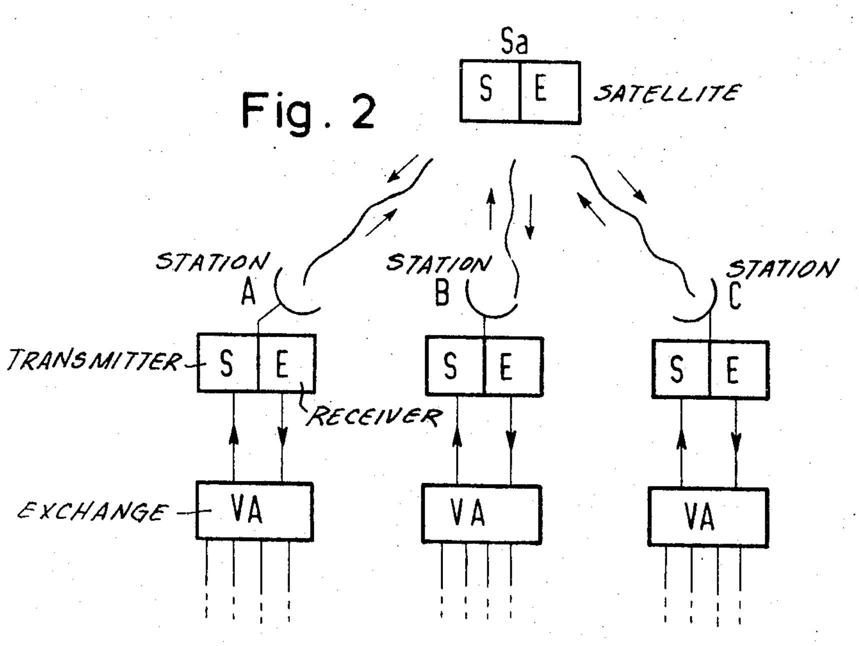
FIG. 2 is a block diagram illustrating in general form a satellite transmission system.

Referring now to the drawings, FIG. 2 illustrates a block circuit diagram for a satellite transmission system on the basis of a time multiplex transmission system. Three stations A, B and C are provided along with one satellite Sa, each station having a transmitter S and a receiver E. The burst 1 of FIG. 1 is assigned to ground station A for its transmitter pulse frame, burst 2 is assigned to ground station B for its pulse frame and burst 3 is assigned to ground station C for its transmission pulse frame. One group of conductors extends from each of the ground stations to the corresponding exchange VA to the transmitter S on the one hand and to the receiver E on the other hand.

The embodiment according to the invention is illustrated diagrammatically for the receiver portion of the individual ground station of importance here. Each receiver comprises for each of the bursts of the pulse frames a special receiver for the evaluation of the internal signal channel, not shown in the drawing for reasons of greater clarity, so that one signal receiver is present in each ground station for bursts 1, 2 and 3, but eliminating the receiver for the burst assigned to the particular transmitter of the ground station involved. The individual signal receivers assigned to the different bursts directly feed the switch and control mechanism of an exchange memory.

The bit sequence accumulating at the output of the receiver E containing the bits of the entire pulse frame is delivered to one single series-parallel converter SPU, a conductor multiple LV ing connected to its output and having as many conductors as there are provided maximum bits per code word in the system.

A number of buffer memories corresponding to the number of time multiplex channels of the receiving station is connected to the conductor multiple above switch groups S11 to S1n, as will be described below. Each switch group, S11 for example, contains a number of switches equal to the conductors in the line multiple LV. The buffer memories in the embodiment are designed as capacitive double memories. The design as double memories is contemplated because in the method an overlapping of the write-in and write-out operations of the memories is inevitable, which in case of single memories would lead to disturbances. Consequently, for example in storing in memory 1 the switch group S11 is closed for the brief switching time of a few nanoseconds, and thus the memory condenser group C1 is operatively connected to the series-parallel converter SPU. During the burst assigned to the transmitter of the receiving station in the pulse frame all switch groups S11 to S1n are definitely open and during this time all second switch groups S21 to S2n are closed in order to recharge the memory condensers C11 to C1n to the level of the memory condensers C21 to C2n. At the end of this period the entire switch group S21 to S2n opens and the data stored in the memory condensers C21 to C2n are available via the switch groups S31 to S3n.

The switch groups S11 to S1n are controlled by an address evaluator AU which is supplied with its information from the internal signal channel of the prevailing burst via the exchange memory VSp and its control values.

The switch groups S21 to S2n switch simultaneously at a moment which the switch groups S11 to S1n and S31 to S3n are opened under the control of a sequency control unit AS.

The switch groups S31 to S3n are controlled individually by a channel distributor containing an address evaluator AUW fed by the channel counter KZ. All conductors of the switch groups are connected in common with the output-side line multiple LV'. An additional address evaluator AUW' connects via switches S41 to S4n the output of the digital-analog-converter DAU to one of the conductors Al to An leading to the corresponding exchange VA. The customary low frequency output circuits are attached to the output conductors Al to An.

It is now important for the transmission system according to the present invention that line connections from the exchange VA to the output connection Al through An of the receiving station are firmly wired and that the assignment of one transmission channel arriving in the receiving station, intended for the exchange VA, be switched via the buffer storage control to one of the conductors connected to available ones of lines Al to An. This is accomplished with a control and switch mechanism, for example according to one of the solutions illustrated in FIGS. 4 and 5.

Figure 4:
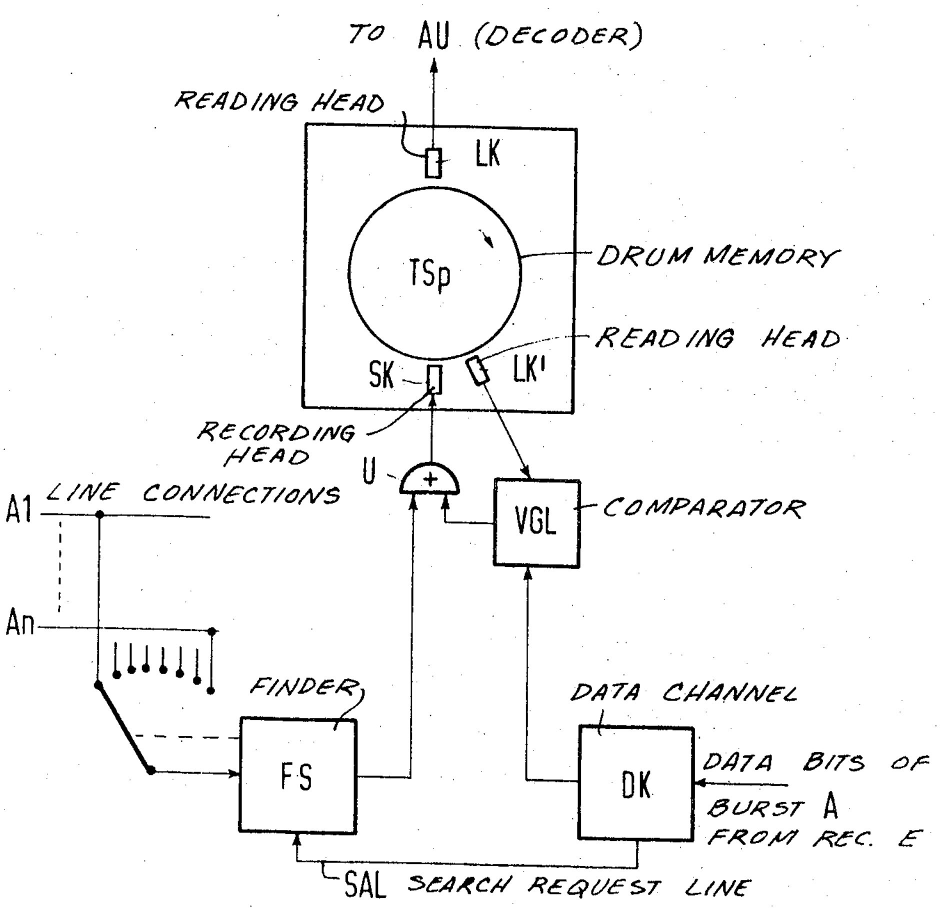
FIG. 4 is a schematic representation of apparatus for connecting an exchange to available output circuits utilizing a drum storage device.

In the embodiment according to FIG. 4, the "time-slot" is determined after the occurence of signal bits in one of the signal receivers of the receiving station, said bits being transmitted for example from station A and intended for station B, in a receiver-internal data channel for burst A, that is the time slot during which the information intended for the receiving station B is present in burst A. With the presence of this signal, a line test is carried out for example at connections Al to An by contacting data channel DK via the search request line SAL, at the same time in order to determine which of the lines leading to the exchange VA happens to be idle at this moment. If such an unoccupied line, for example the line connected to Al, is found, this line connection is blocked (busied) for occupation in favor of other channels and occupied for the connection now requested. One memory is also energized by the finder FS and the receiver-internal data channel DK that a classification criterion results at its output for the duration of the subsequent connection for conversation for the time slot in the burst of the station A, and the connection is determined as available, for example line Al in station B. For instance, this can be done by means of a drum memory rotating at a correspondingly high speed whose recording head SK is furnished by the finder FS with criterion identifying line Al, which it records, however, only during the corresponding time slot in burst A, into the drum memory TSp. To make sure a reading head LK' is provided to determine the prevailing phase and/or angle position of the drum whose information is compared with the predetermined value from the receiver-internal data channels DK in the comparator circuit VGL and upon agreement the AND gate U is open for recording the information from free finder FS in the drum memory TSp. Then the recording head LK receives (until erasure of this information following disconnection of the conversation connection) these classification criteria of the time slot of the line connection Al permanently and can induce by way of an interposed evaluator, if necessary, the corresponding control of the switch group S11.

The drum storer can advantageously be replaced with a static memory, such as a nuclear memory or a thin layer memory, whih is less expensive and simpler as a rule. Memories of this type are sufficiently known so that a detailed description thereof is not necessary.

Figure 3:
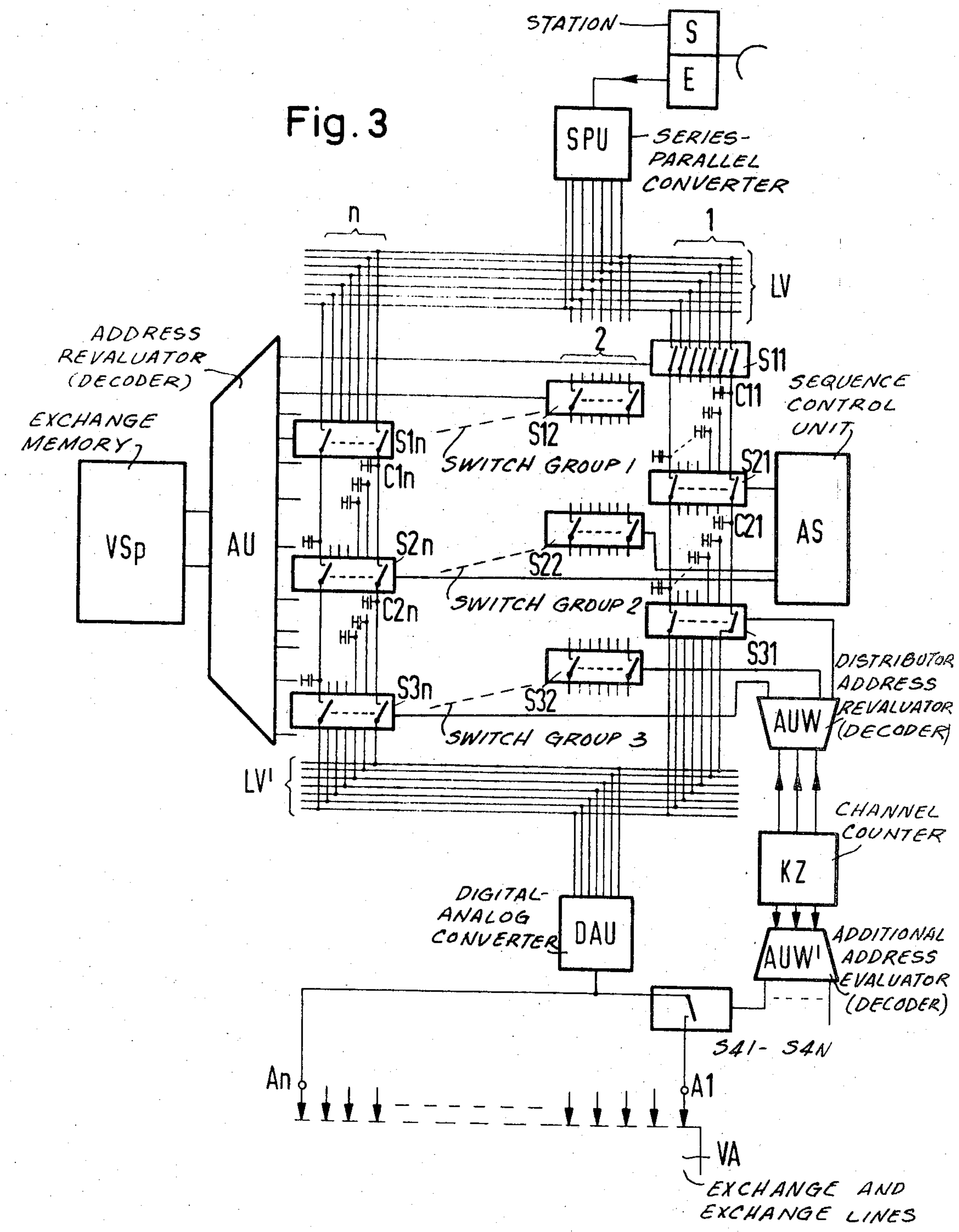
FIG. 3 is a schematic representation of apparatus according to the present invention including the switch groups, the series-parallel converter and the buffer memories.
Figure 5:
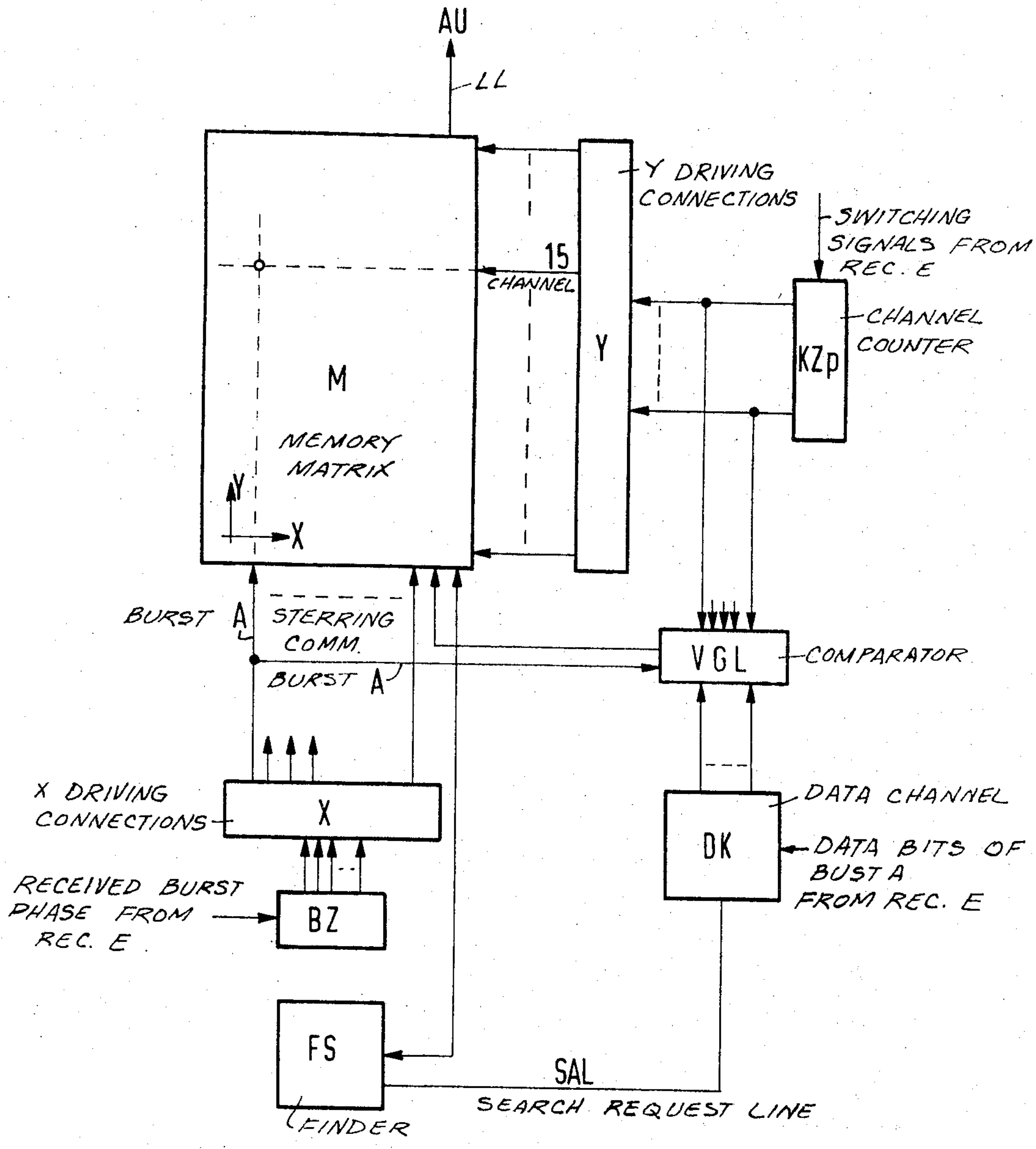
FIG. 5 is a schematic representation of another embodiment for connecting an exchange to a plurality of output circuits through the utilization of a static memory device.

The corresponding diagram for utilizing a static memory is illustrated in FIG. 5 using identical reference symbols for parts identical to the apparatus shown in FIG. 4. The finder FS and the receiver-internal data channel DK are fed with information as in FIG. 4. A primary channel counter KZp which consecutively connects the individual lines of the memory matrix M is assigned to memory M for the division into a number of storage places corresponding to the entire pulse frame and its time multiplex channels. At the same time these connecting impulses and/or connecting addresses are supplied to a comparator VGL which effects a comparison upon the receipt of a connected address with a control command identifying the individual bursts with the address data received from the data channel DK. When this comparison turns out positive, a corresponding recording command is given to the memory matrix M. This recording command can be executed analogously to the embodiment according to FIG. 4 only when at the same time a corresponding line information is available from the finder FS via a busy line, which information is to be recorded in the memory M. The memory M is therefore divided in the X direction into a number of columns corresponding to the number of bursts and thereby to the total number of stations present. In the Y direction the memory M has a number of lines equal to the time multiplex channels that may be present in the individual burst. Naturally, each individual memory place has as many memory locations as the number of data recording possibilities by way of the line to the exchange VA which arrives from the finder FS. Due to the fact that the channel counter KZp is switched in synchronism with the sequence of the time multiplex channels, data analogous to the drum memory reader head LK according to FIG. 4 then appears at the output and/or the reader conductor LL of the memory M, which data can be evaluated accordingly, namely in the evaluator AU of FIG. 3.

The lines of memory M are operated in the Y direction and the columns are operated in the X direction by a burst counter which receives its switching and/or counting data from the corresponding receiver E. The primary channel counter KZp receives its switching and/or counting information likewise from the receiver E.

The system according to the present invention also can possess code words and/or transmission channels with varying bit content. If for example the burst 1 contains at first after the internal signal channel four telegraphy channels having in each case only one time slot of one bit and subsequently two data channels whose time slot comprises two bits in each case, the subsequent transmission channels may easily be speech channels with eight bits each or some other number of bits per time slot. This merely signifies for the switching and/or control mechanism that in the individual memory group only correspondingly fewer switches are to be operated, for example in the memory Group I in a 1 bit telegraphy system only the top-most switch is to be operated for the corresponding switching phase, while the remaining switches in memory Group I always remain open.

I claim as my invention:

1. In a time multiplex transmission system of the type having a large number of station channels, wherein satellite connections are to be established between certain station channels and an exchange is assigned to each station and operated to connect the channels available at a station to the telephone lines serving the exchange via connections between the station and the exchange, wherein a time section is assigned to each transmitting station within the pulse frame of the time multiplex system, and wherein an internal signal channel is included within each time section prior to the code words of the respective channels and contains data identifying a called station channel to be connected through to a calling station channel, and wherein in the receiving station a series-parallel converter is provided for the time multiplex signal there arriving and operated to transmit, during the conversion time of said serial to parallel converter, code words into a plurality of buffer memories for evaluation in the receiving station, which code words are to be supplied to the associated exchange, each said buffer memory being associated with an individual time multiplex channel, the improvement comprising: a control and switch system in said receiving station connected to the associated exchange and connected to receive data from the data channel and including means for finding an available connection between said station and its associated exchange in response to receipt of signals in the data channel identifying the station channel; and means for connecting one of said buffer memories between said available connection and said series-parallel converter during respective times of the subsequent periodically occurring code words.

2. In a time multiplex transmission system according to claim 1, wherein said control and switching system includes means for establishing connections through the transmission system in a rearward direction from the receiving exchange to the transmitting exchange during the search for said available connection and includes a four-wire transmission path.

3. In a time multiplex transmission system according to claim 1, wherein bits of data transmission are assigned fixed time positions and are reserved in the bit sequence of the burst assigned in each case to the individual stations, and wherein said individual buffer memories are provided with a plurality of bit places, and said control and switching system includes means responsive to the received bits of data which constitute a code word of less than a predetermined maximum number of bits in a timed section to connect respective places of the corresponding buffer memory to said available connection.

4. In a time multiplex transmission system according to claim 1, wherein each of said receiving stations includes its own plurality of signaling receivers individually associated with the transmitting burst assigned to the other individual stations, a finder for finding an available connection between said station and the corresponding exchange, and a memory connected to said signaling receiver and said finder and operated in response thereto for establishing the switching interval for the connection between said series-parallel converter and said buffer memory.--

5. In a time multiplex transmission system according to claim 1, wherein said buffer memory comprises for each bit of the individual code word a separate memory place which includes a first memory element into which the information from said series-parallel converter is stored and a second memory element into which said information is transferred following storage in said first memory element, said information being subsequently removed from said second memory element, and comprising periodically operated switching means for storing information in said first memory element.

6. In a time multiplex transmission system according to claim 1, wherein pulse modulation is employed, comprising a decoder common to all memories, a cyclically rotating scanning switch connected to said decoder and operative to connect said decoder to the outputs of the individual buffer memory, a cyclically rotating distributor operating synchronously with said scanning switch connected to said decoder for connecting said decoder to the individual lines of said exchange.

7. In a time multiplex transmission system according to claim 1, comprising means for determining the lines available between the receiving station and the corresponding exchange including testing apparatus operative to determine idle buffer memories, said testing apparatus having means for identifying an idle memory as an available connection to the exchange.

8. A time multiplex transmission system having a large number of channels, comprising a plurality of stations having a plurality of transmission channels, a plurality of exchanges, each said exchange assigned to a separate station and utilized to connect the transmission channels available to said separate station to connections of the associated exchange, a cyclically reoccurring pulse frame for the time multiplex system including a plurality of time sections each of which is assigned to a separate transmitting station, the time multiplex channels associated with each exchange being within the time section assigned to the corresponding station, an internal channel included within each time section having data defining the time interval in which a corresponding time multiplex channel is to be connected through to an exchange, a series-parallel converter in each station for receiving the time multiplex signals arriving at such station, a plurality of buffer memories included in each station connected and associated with the series-parallel converter of the station for storing the converted information for further processing, a plurality of connections between each station and its corresponding exchange, means for finding a free one of said connections in response to signals received at said station, each of said connections having one of said buffer memories assigned thereto, and means for connecting the buffer memory corresponding to an available connection to said series-parallel converter.

9. A time multiplex transmission system according to claim 8, wherein each of said buffer memories includes a plurality of storage locations and wherein the last-mentioned means is operative to connect selected storage locations of a buffer memory to said series-parallel converter corresponding to the bits of data of a time section received at said station.

10. A time multiplex transmission system according to claim 9, wherein each of the individual stations has a unique transmitting burst and each of said stations includes a signaling receiver for each of the transmitting bursts assigned to the other individual stations and wherein each station includes a line finder for determining available connections between a station and its corresponding exchange.

11. A time multiplex transmission system according to claim 10, and further comprising a connecting memory in each of said stations connected to the output of said signaling receiver and said line finder to establish the time section for the available connection between said series-parallel converter and said buffer memory.

12. A time multiplex transmission system having a large number of channels, comprising a plurality of stations having a plurality of transmission channels, a plurality of exchanges, each said exchange assigned to a separate station and utilized to connect the transmission channels available to said separate station to connections of the associated exchange, a cyclically reoccurring pulse frame for the time multiplex system including a plurality of time sections each of which is assigned to a separate transmitting station, the time multiplex channels associated with each exchange being within the time section assigned to the corresponding station, an internal data channel included within each time section having data defining the time interval in which a corresponding time multiplex channel is to be connected through to an exchange, a series-parallel converter in each station for receiving the time multiplex signals arriving at such station, a plurality of buffer memories in each station connected and associated with the series-parallel converter of the station for storing the converted information for further processing, a plurality of connections between each station and its corresponding exchange, means for finding a free one of said connections in response to signals received at said station, each of said connections having one of said buffer memories assigned thereto, and means for connecting the buffer memory corresponding to an available connection to said series-parallel converter, wherein said buffer memory comprises for each bit of the individual code word a separate memory place which includes a first memory element into which the information from said series-parallel converter is stored and a second memory element into which said information is transferred following storage in said first memory element, said information being subsequently removed from said second memory element, and comprising periodically operated switching means for storing information in said first memory element.

* * * * *